(12) United States Patent
Saito

(10) Patent No.: US 7,628,348 B2
(45) Date of Patent: Dec. 8, 2009

(54) REEL UNIT OF SPINNING REEL

(75) Inventor: Kei Saito, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/205,920

(22) Filed: Sep. 8, 2008

(65) Prior Publication Data

US 2009/0072065 A1 Mar. 19, 2009

(30) Foreign Application Priority Data

Sep. 14, 2007 (JP) ............... 2007-239755

(51) Int. Cl.
*A01K 89/01* (2006.01)
(52) U.S. Cl. ............... 242/311; 242/310; 242/319
(58) Field of Classification Search ............... 242/310, 242/311, 312, 319
See application file for complete search history.

(56) References Cited

U.S. PATENT DOCUMENTS

| | | | | |
|---|---|---|---|---|
| 3,794,264 | A * | 2/1974 | Hull | 242/311 |
| 5,350,130 | A * | 9/1994 | Hitomi et al. | 242/241 |
| 6,598,819 | B2 * | 7/2003 | Furomoto | 242/319 |
| 6,629,655 | B2 * | 10/2003 | Kitajima | 242/311 |
| 6,712,301 | B2 * | 3/2004 | Morise | 242/319 |
| 6,874,717 | B2 * | 4/2005 | Takikura et al. | 242/242 |
| 7,070,138 | B2 * | 7/2006 | Iwabuchi et al. | 242/311 |
| 7,121,491 | B2 * | 10/2006 | Kitajima | 242/316 |
| 2006/0186242 | A1 * | 8/2006 | Iwabuchi et al. | 242/311 |

FOREIGN PATENT DOCUMENTS

| | | |
|---|---|---|
| EP | 1514471 A | 3/2005 |
| JP | 2004-254534 A | 9/2004 |
| JP | 2005-211038 A | 8/2005 |
| JP | 2006-115808 | 5/2006 |

\* cited by examiner

*Primary Examiner*—Emmanuel M Marcelo
(74) *Attorney, Agent, or Firm*—Shinjyu Global IP

(57) ABSTRACT

An interlocking groove is formed on the rear upper surface of a chassis part so as to be exposed outside. A mounting hole opened backward is formed in an attachment portion. A first cover member includes a pivot shaft portion pivotably mounted to the mounting hole, and a first interlocking protrusion allowed to be interlocked with the interlocking groove when the pivot shaft portion is mounted to the mounting hole and the first cover body is pivoted with respect to the axis of the mounting hole. A second cover member is configured to cover the surrounding of the first interlocking protrusion interlocked with the interlocking groove in the lower side of the rear part of the first cover member by a retaining portion disposed on the upper part of the second cover member.

7 Claims, 10 Drawing Sheets

REEL UNIT OF SPINNING REEL

CROSS-REFERENCE TO RELATED APPLICATIONS

This application claims priority under 35 U.S.C. § 119 to Japanese Patent Application No. 2007-239755 filed on Sep. 14, 2007. The entire disclosure of Japanese Patent Application No. 2007-239755 is hereby incorporated herein by reference.

BACKGROUND OF THE INVENTION

1. Field of the Invention

Aspects of the present invention generally relate to a reel unit, and more specifically, to a reel unit of a spinning reel that is allowed to reel out a fishing line forward and the upper part thereof is configured to be mounted to a fishing rod.

2. Background Information

In general, a spinning reel includes a reel unit, a handle, a rotor, and a spool. The reel unit is mounted to a fishing rod. The handle is rotatably attached to the reel unit. The rotor is rotatably mounted to the reel unit. The spool is mounted to the reel unit in front of the rotor and is allowed to move back and forth. A fishing line guided by the rotor is wound around the outer periphery of the spool.

The reel unit includes a T-shaped rod attachment leg portion and a reel body. The T-shaped rod attachment leg portion is mounted to a fishing rod. The reel body is formed integral with the rod attachment leg portion. A variety of mechanisms are accommodated in the interior of the reel body. The reel body includes a body member and a lid member. The body member has a laterally-opened interior space. The lid member is detachably mounted to the body member, and covers the opening of the body member. Also, a cover member (guard member) is mounted to the rear part of the reel body and covers the bottom part of the reel body from the rear part of the reel body (see, for example, Japanese Patent Application Publication No. 2004-254534). The cover member is mounted to the reel body from behind of the reel body. The cover member is fixed to the reel body by screw members inserted from behind and the bottom of the reel body.

SUMMARY OF THE INVENTION

In the above described conventional reel unit, the cover member is only fixed to the reel body by the screw members inserted from behind and the bottom of the reel body. It has been discovered that if a great impact is applied to the cover member, for instance, by dropping the reel unit with its cover member facing the ground or by strongly pulling the cover member backward, the cover member may come off the reel body, especially in a reel unit having a hollow space formed between a rear part of the reel body and the cover member when the cover member is mounted to the reel body.

Accordingly, aspects of the present invention have been created to solve the above-mentioned problems occurring in the conventional practice and to prevent a cover member from easily coming off the reel body of a reel unit of a spinning reel.

According to one aspect of the present invention, an upper part of a reel unit of a spinning reel is mounted to a fishing rod. The reel unit is arranged to reel out a fishing line forward. The reel unit comprises a reel body, an attachment portion, and a first cover member. The reel body includes a variety of mechanisms mounted in an interior thereof. An interlocking groove is provided on the outer rear surface of the reel unit such that the interlocking groove is exposed to the outside. The attachment portion is mounted to the fishing rod and has a mounting hole opened in the rearward direction. The attachment portion is formed integral with and extending forward from the reel body in an oblique upward direction. The first cover member includes a first cover body, a pivot shaft portion, and an interlocking protrusion. The first cover body is mounted to the reel body so as to cover the upper side of the rear part of the reel body from the lower side of the rear part of the attachment portion. The pivot shaft portion is formed on the upper side of the front part of the first cover body so as to protrude frontward. The pivot shaft portion is pivotably mounted to the mounting hole. The interlocking protrusion is formed on a bottom part of the first cover body and arranged to interlock with the interlocking groove when the pivot shaft portion is mounted to the mounting hole and the first cover body is pivoted with respect to the axis of the mounting hole.

In the reel unit, the interlocking groove exposed to the outside is formed on the rear upper surface of the reel body. The mounting hole opened rearward is formed in the attachment portion. The first cover member mainly includes the pivot shaft portion pivotably mounted to the mounting hole and the interlocking protrusion allowed to be interlocked with the interlocking groove when the pivot shaft portion is mounted to the mounting hole and the first cover body is pivoted around the axis of the mounting hole. Here, the first cover member is configured that the interlocking protrusion is interlocked with the interlocking groove when the first cover body is pivoted around the axis of the mounting hole. Therefore, even if a great impact is applied to the first cover member, the first cover member will not easily come off the reel body. Especially, even if the first cover member is strongly pulled in the rearward direction, the rear end surface of the interlocking protrusion is interlocked with the interlocking groove, because the pivot direction of the first cover member is directed in a horizontal direction perpendicular to an attachment/detachment direction of the first cover member while the attachment/detachment direction is directed to the anteroposterior direction. Accordingly, the first cover member will not easily come off the reel body in the rearward direction.

According to another aspect of the present invention, a reel unit further includes a second cover member. Here, the second cover member has a second cover body and a retaining portion. The second cover body is mounted to the reel body so as to cover the lower side of the rear part of the reel body from the lower side of the rear part of the first cover member. The retaining portion is formed in the upper part of the second cover body. The retaining portion at least covers the surrounding of the interlocking groove and the interlocking protrusion interlocked with the interlocking groove. In this case, the second cover member is configured to cover the surrounding of the interlocking groove in the lower side of the rear part of the first cover member and the interlocking protrusion interlocked with the interlocking groove with the retaining portion provided in its upper part. Therefore, it is possible to regulate the rearward movement of the first cover member by the second cover member, and accordingly the first cover member will not easily come off the reel body in the rearward direction.

With a configuration that a cover member is made up of two pieces, that is, the first cover member to be mounted to the upper side of the rear part of the reel body and the second cover member to be mounted to the lower side of the rear part of the reel body and the rear part of the reel body are separately formed, for example, it is possible to maintain high strength of the second cover member easily made contact with a rocky site and the like by forming it with highly hard metal, while it is possible to realize light weight of the first cover member that impact is not relatively easily applied by forming it with synthetic resin.

According to another aspect of the present invention, a reel unit wherein the second cover member is formed to cover the first cover member only with a portion of the second cover member that the retaining portion is formed. In this case, the first cover member is configured to be covered only with a portion of the second cover member that the retaining portion is formed. Therefore, it is possible to prevent the reel from being entirely formed in a large size, for instance, compared to a case that the first cover member is configured to be mounted to the entire rear part of the reel body and the second cover member is configured to be mounted to the entire rear part of the first cover member.

According to another aspect of the present invention, the first cover member in the reel unit further includes a protrusion. The protrusion is formed on the bottom part of the first cover body and protrudes downward. The protrusion is supported between the rear end part of the reel body and the retaining portion of the second cover member when the second cover member is mounted to the reel body. In this case, the first cover member will not easily come off the reel body in the rearward direction not only by making the interlocking protrusion interlocked with the interlocking groove of the reel body but also supporting the protrusion between the reel body and the retaining portion of the second member.

According to another aspect of the present invention, a reel unit wherein the reel body further includes a threaded hole formed on the lower part thereof. The second cover member further includes a through hole. The through hole is formed in the bottom part thereof and is communicated with the threaded hole. The second cover member is fixed to the reel body from the below by a screw member mounted to the through hole and the threaded hole. In this case, rearward movement of the first cover member is regulated by the second cover member. Therefore, with the configuration that the second cover member is fixed to the reel body by a screw, it is not necessary to fix the first cover member to the attachment portion and the reel body by the screw.

According to another aspect of the present invention, a reel unit wherein the mounting hole and the tip of the pivot shaft portion mounted to the mounting hole extends forward in an obliquely downward direction. In this case, the pivot shaft of the pivot shaft portion is directed to be perpendicular to the spool shaft in the direction from the rear towards the front. Therefore, compared to a case that the pivot shaft of the pivot shaft portion is directed in parallel to the spool shaft, the first cover member does not easily come off the reel body in the rearward direction.

According to another aspect of the present invention, a reel unit wherein the reel body is formed in a shape that a hollow space is formed between the reel body and the first cover member when the first cover member is mounted to the reel body. In this case, a hollow space is formed between the reel body and the first cover member, and thus flexibility of the pivot direction and the pivot range of the first cover member will be increased.

According to yet another aspect of the present invention, because the interlocking protrusion is interlocked with the interlocking groove when the first cover body is pivoted around the axis of the mounting hole, the first cover member of the reel unit of the spinning reel does not easily come off the reel body even if a great impact is applied to the first cover member.

These features, aspects and advantages of the present invention will become apparent to those skilled in the art from the following detailed description, which, taken in conjunction with the annexed drawings, disclose embodiments of the present invention.

BRIEF DESCRIPTION OF THE DRAWINGS

Referring now to the attached drawings which form a part of this original disclosure.

DETAILED DESCRIPTION OF THE EMBODIMENTS

Figure 1:
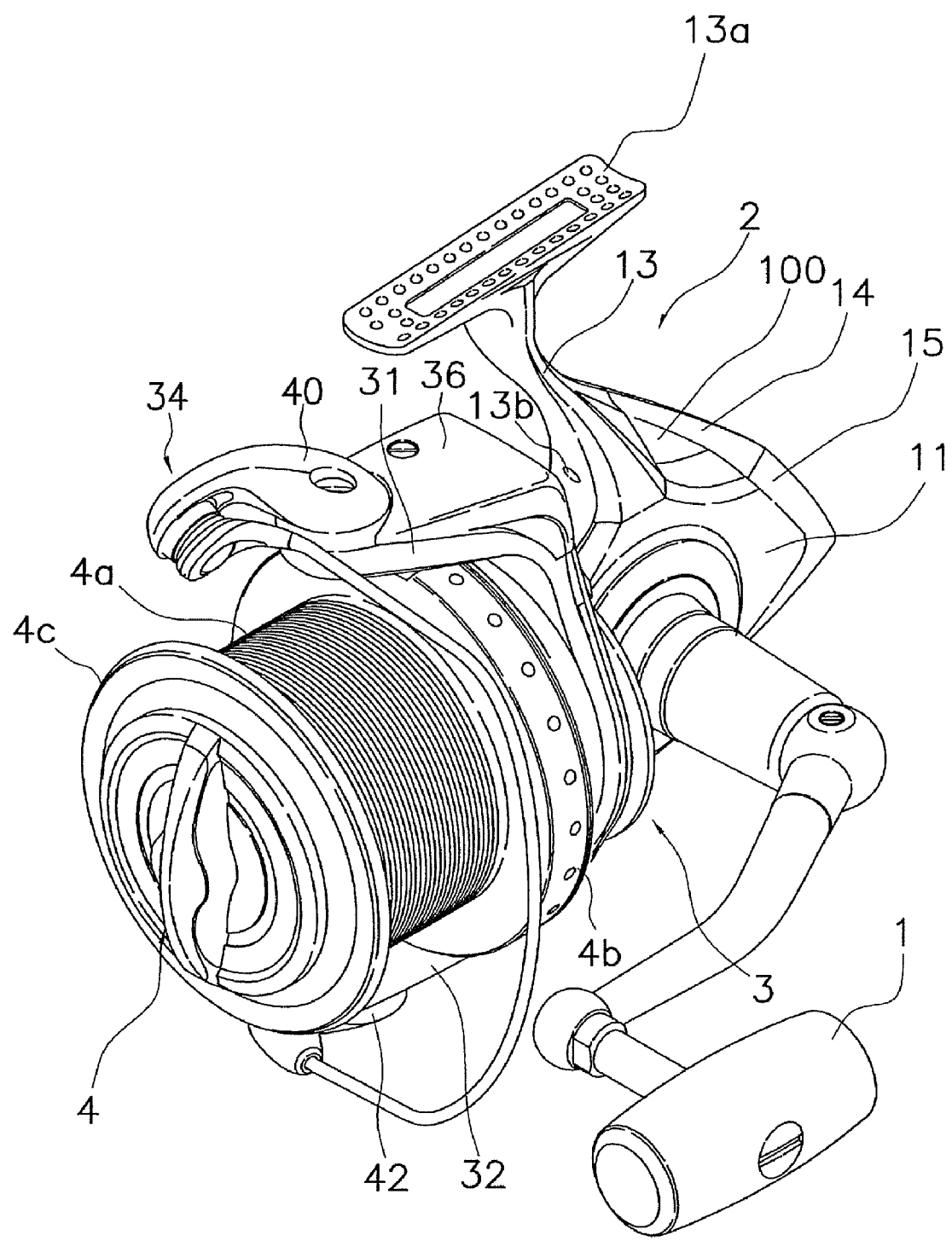
FIG. 1 is a lateral view of a spinning reel to which an embodiment of the present invention is applied.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-4, a spinning reel for surf casting is illustrated according to an example embodiment of the present invention. The spinning reel generally includes a reel unit 2, a rotor 3, and a spool 4. The reel unit 2 has a handle 1 and is mounted to a fishing rod. The rotor 3 is rotatably mounted to the front part of the reel unit 2. The spool 4 is disposed on the front part of the rotor 3 and moves back and forth. Also, the spinning reel includes a rotor driving mechanism 5, and an oscillation mechanism 6. The rotor driving mechanism 5 rotationally drives the rotor 3 in conjunction with rotation of the handle 1. The oscillation mechanism 6 moves the spool 4 back and forth in conjunction with rotation of the rotor 3.

The reel unit 2 accommodates the rotor driving mechanism 5 and the oscillation mechanism 6 in the interior thereof. As illustrated in FIGS. 1-4, the reel unit 2 includes a chassis part 10, a first lid member 11, a second lid member 12, a T-shaped attachment portion 13, a first cover member 14 and a second cover 15. The chassis part 10 is a framed shaped member with openings on both sides. The first and second lid members 11 and 12 are used to cover both sides of the chassis part 10 and are made of an aluminum alloy. However, other materials with similar characteristics can be used as well. The attachment portion 13 is formed integral with the chassis part 10. The first and second covers 14 and 15 cover the chassis part 10, the first lid member 11, and the second lid member 12 from behind.

Figure 2:
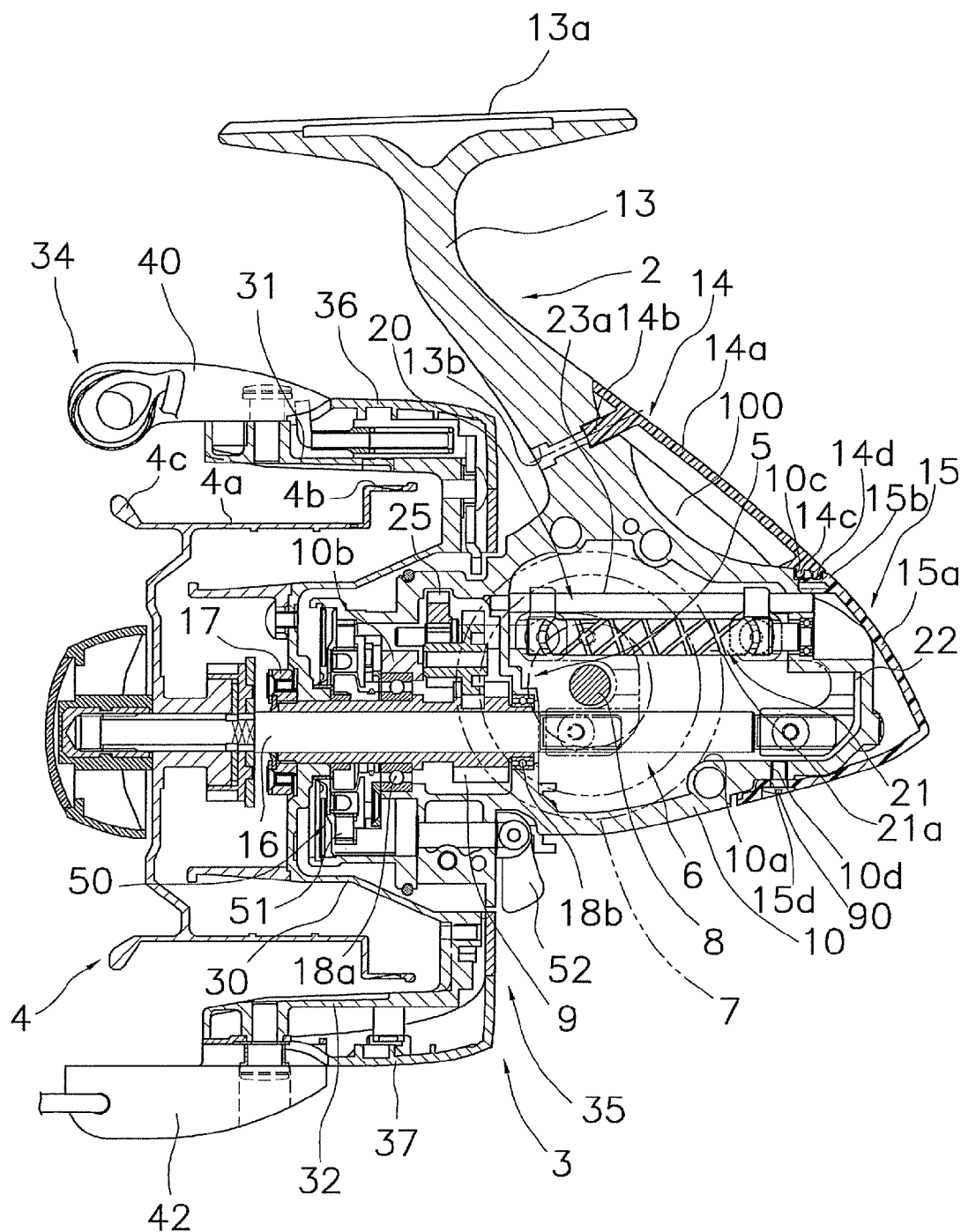
FIG. 2 is a lateral cross-sectional view of the spinning reel.
Figure 3:
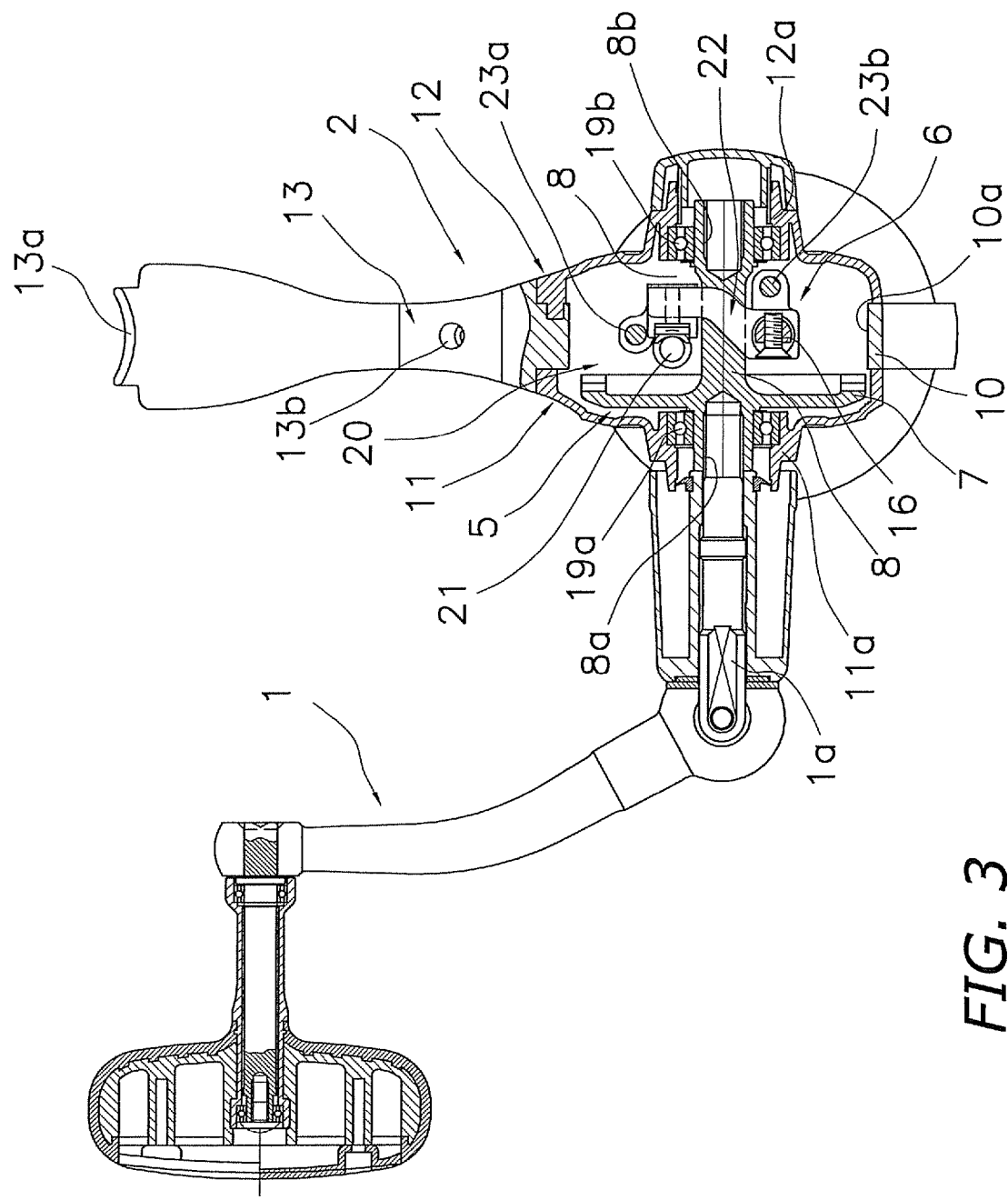
FIG. 3 is a rear cross-sectional view of the spinning reel.
Figure 4:
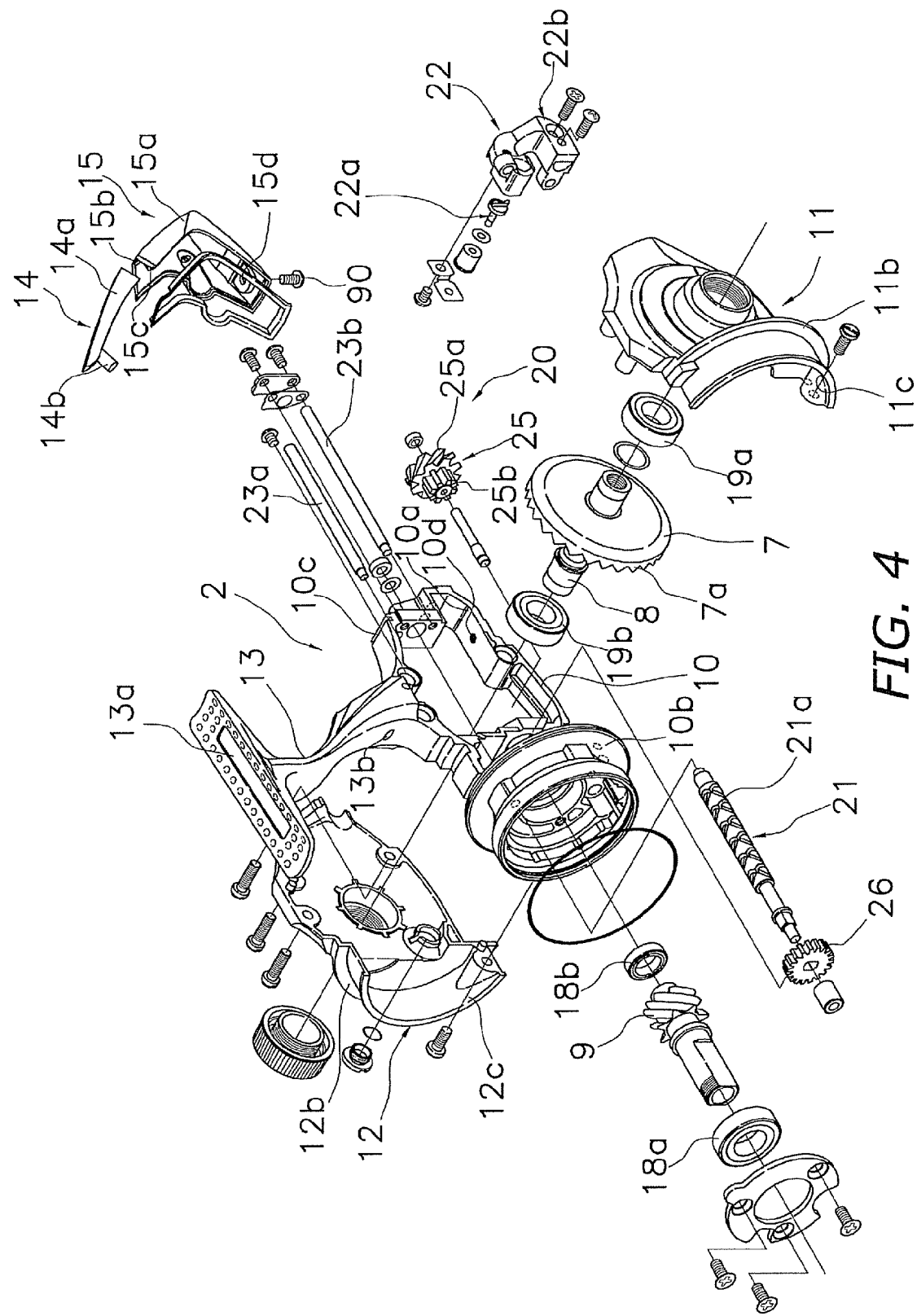
FIG. 4 is a perspective view of the spinning reel.
Figure 8:
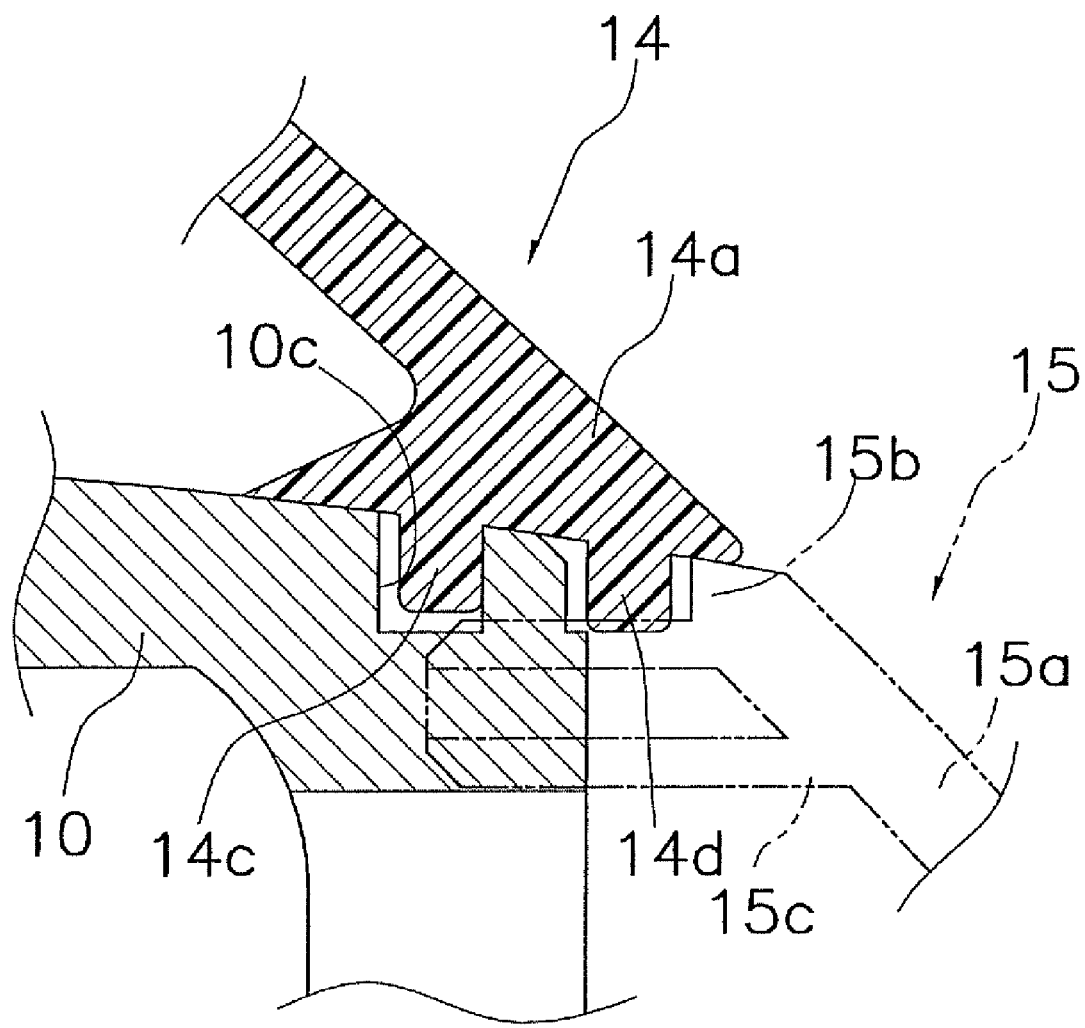
FIG. 8 is an enlarged lateral cross-sectional view of the first cover member and the second cover member.

As illustrated in FIGS. 2-4, the chassis part 10 is made, for instance, of an aluminum alloy. However, other materials with similar characteristics can be used as well. The chassis part 10 includes an interior space 10a for accommodating and supporting the rotor driving mechanism 5 and the oscillation mechanism 6. As illustrated in FIGS. 2 and 4, a disk shaped mechanism supporting portion 10b is formed on the front surface of the chassis part 10. Elements such as a one-way clutch 51 (to be described) of an anti-reverse rotation mechanism 50 and a pinion gear 9 (to be described) are mounted to the disk shaped mechanism supporting portion 10b. Also, as illustrated in FIGS. 2 and 4, the chassis 10 includes an interlocking groove 10c and a threaded hole 10d. The interlocking groove 10c is formed on the rear upper outerside surface of the chassis part 10. Also, a first interlocking protrusion 14c (to be described) of a first cover member 14 is allowed to interlock with the interlocking groove 10c. The threaded hole 10d is formed in the bottom part of the chassis part 10. As illustrated in FIG. 8, the interlocking groove 10c is a portion that is cut out on the rear upper outer side surface of the chassis part 10 in a horizontal direction corresponding to a pivot direction of the first cover member 14.

For instance, the first lid member 11 is constructed to cover one side of the chassis part 10. As described in FIGS. 3 and 4, the first lid member 11 is disposed adjacent to a master gear 7. Also, as illustrated in FIG. 3, a first boss portion 11a is formed approximately in the center part of the first lid member 11. The first boss portion 11a protrudes outward and supports an end of a master gear shaft 8 coupled to the rear surface side of the master gear 7. Also, as illustrated in FIG. 4, an approximately semi-circular first flange portion 11b is formed in the front part of the first lid member 11. The first flange portion 11b forms part of a disk portion for entering the interior of the rotor 3. Furthermore, as illustrated in FIG. 4, an approximately semi-circular arc shaped first mechanism accommodating cover 11c is formed in the front part of the first flange portion 11b. The first mechanism accommodating cover 11c is disposed on the rear surface of the mechanism supporting portion 10b. The first mechanism accommodating cover 11c is formed approximately co-planar with the outer peripheral surface of the mechanism supporting portion 10b.

For instance, the second lid member 12 is formed to have a shape symmetrical to the first lid member 11. As illustrated in FIGS. 3 and 4, a second boss portion 12a, a second flange portion 12b, and a second mechanism accommodating cover 12c are formed in the second lid member 12. The second boss portion 12a, the second flange portion 12b, and the second mechanism accommodating cover 12c are formed to have a shape symmetrical to the first boss portion 11a, the first flange portion 11b, and the first mechanism accommodating cover 11c, respectively. Therefore, the first flange portion 11b and the second flange portion 12b are constructed to form a circular shape with the outer peripheral surface of the rear surface of the mechanism supporting portion 10b of the chassis part 10. The circular shaped portion is configured to be fitted into the rear surface of the rotor 3 through a slight gap.

Note that the first lid member 11 and the second lid member 12 are fixed to the chassis part 10 by a single or plurality of fixing screws, e.g. round-head screws. As illustrated in FIGS. 1-4, the attachment portion 13 is a T-shaped member extending upward from the chassis part 10. A reel leg 13a is formed on the tip of the attachment portion 13 so as to extend from the back to the front of the reel unit 2. The reel leg 13a is mounted to a reel sheet (not illustrated in the figure) of a fishing rod. Also, as illustrated in FIGS. 1-4, the attachment portion 13 includes a mounting hole 13b. The mounting hole 13b penetrates the attachment portion 13 from the back through to the front. A pivot shaft portion 14b (to be described later) of the first cover member 14 is pivotably mounted to the mounting hole 13b from behind. The mounting hole 13b extends frontward in a obliquely downward direction relative to a spool shaft 16.

Figure 7:
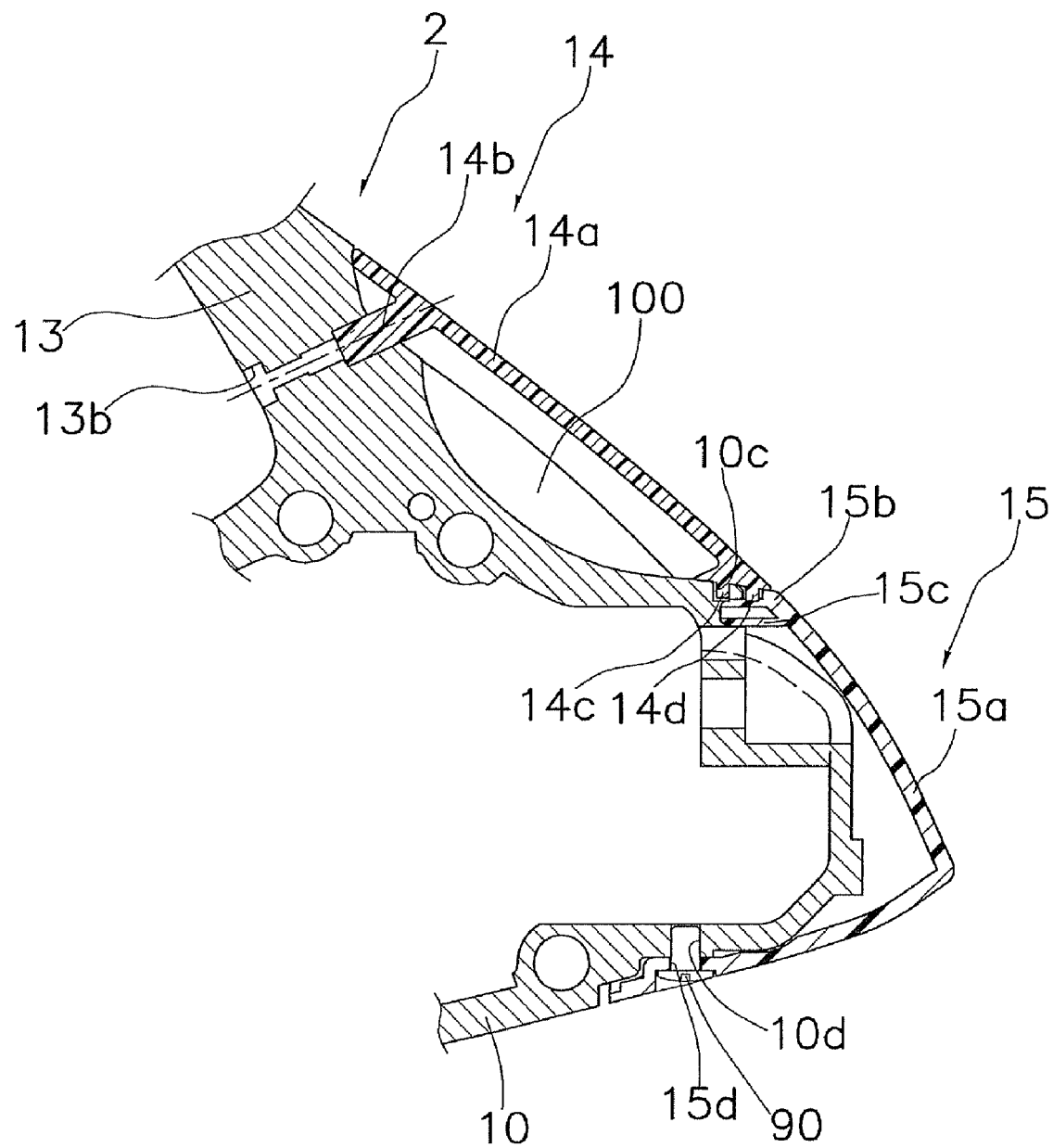
FIG. 7 is a lateral cross-sectional view of the first cover member and the second cover member.

As illustrated in FIGS. 1-4, the first cover member 14 and the second cover member 15 are curved so as to cover the lateral part and the bottom part of the chassis part 10 from behind in a state that the first lid member 11 and the second lid member 12 have been already mounted to the chassis part 10. The first cover member 14 and the second cover member 15 are made of relatively hard synthetic resin, e.g. ABS resin. However, other materials with similar characteristics can be used as well. Metallic plating is performed with respect to the surface thereof. As illustrated in FIGS. 1, 2, and 7, the rear surface of the chassis part 10 is formed to have a recess. The rear surface of the chassis part 10 is configured so that a hollow part 100 is formed between recessed portion of the chassis part 10 and the first cover member 14 when the first cover member 14 is mounted to the chassis part 10.

As illustrated in FIGS. 2, 4, 5, 7, and 8, the first cover member 14 includes a first cover body 14a, the pivot shaft portion 14b, the first interlocking protrusion 14c, and a second interlocking protrusion 14d. The first cover body 14a is mounted to the chass part 10 to cover the upper side of the rear part of the chassis part 10 from the lower side of the rear part of the attachment portion 13. The pivot shaft portion 14b is formed on the upper side of the front part of the first cover body 14a and protrudes substantially forward. The pivot shaft portion 14b is pivotably mounted to the mounting hole 13b. The first interlocking protrusion 14c is formed on the bottom part of the first cover member 14a. The first interlocking protrusion 14c is interlocked with the interlocking groove 10c when the pivot shaft portion 14b is mounted to the mounting hole 13b and the first cover body 14a is pivoted with respect to the axis of the mounting hole 13b. The second interlocking protrusion 14d is formed on the bottom part of the first cover body 14a and protrudes downward. The second interlocking protrusion 14d is supported between the rear end portion of the chassis part 10 and the retaining portion 15b of the second cover member 15 when the second cover member 15 is mounted to the chassis part 10.

Figure 5:
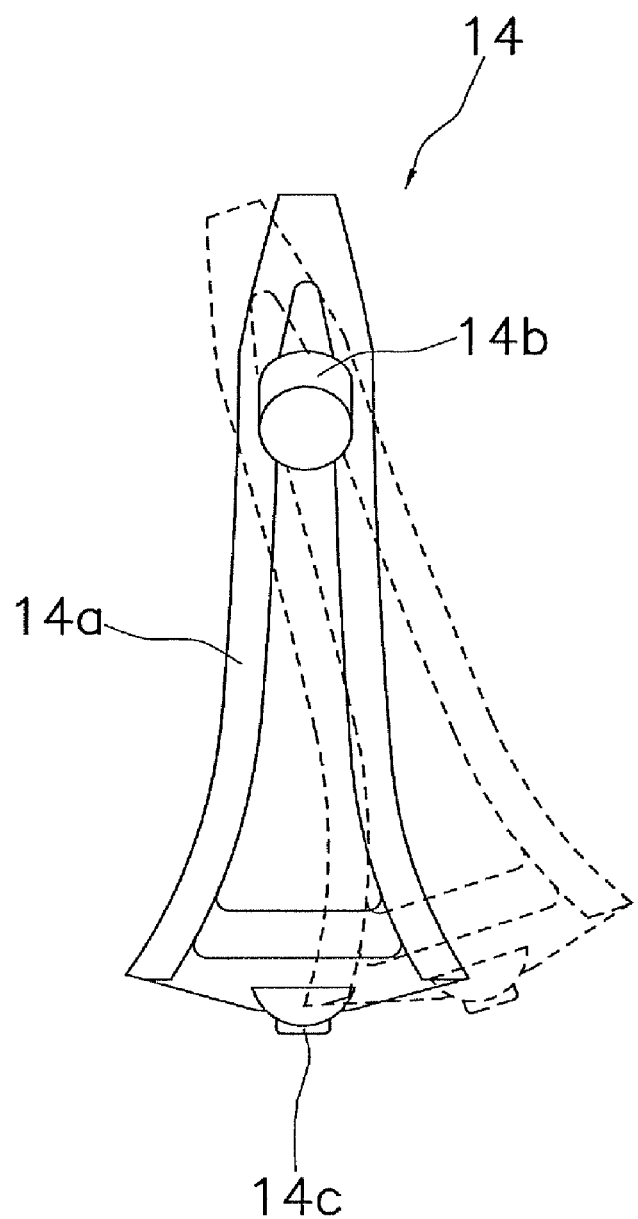
FIG. 5 is a front view of a first cover member.

As illustrated in FIGS. 5 and 7, the first cover body 14a is a concave shaped member that is tapered upward. The outer shape of the first cover body 14a is formed to fit the shape of the upper side of the rear part of the chassis 10. As illustrated in FIGS. 4, 5, and 7, the pivot shaft portion 14b extends frontward in an obliquely downward direction when the pivot shaft portion 14b is mounted to the mounting hole 13b. In other words, when the first cover body 14a is pivoted in the horizontal direction, as illustrated in FIG. 5, while the pivot shaft portion 14b is mounted to the mounting hole 13b, as illustrated in FIG. 7, the pivot shaft extends in an oblique direction relative to the spool shaft 16 in a direction from the rear towards the front of the reel unit. Because of this, while the attachment/detachment direction of the first cover member 14 is in a direction from the rear towards the front of the reel unit, the pivot direction of the first cover member 14 is configured to be in the horizontal direction perpendicular to the attachment/detachment direction.

As illustrated in FIG. 8, the first interlocking protrusion 14c is formed on the bottom part of the first cover body 14a and protrudes downward. The first interlocking protrusion 14c is interlocked with the interlocking groove 10c when the pivot shaft portion 14b is mounted to the mounting hole 13b and the first cover body 14a is pivoted with respect to the axis of the mounting hole 13b. As illustrated in FIG. 8, the second interlocking protrusion 14d is formed on the bottom part of the first cover member 14a, and protrudes downward. The second interlocking protrusion 14d is located in a position rear to and adjacent from the first interlocking protrusion 14c. The second interlocking protrusion 14d is supported between the rear end portion of the chassis part 10 and the retaining portion 15b of the second cover member 15 when the second cover member 15 is mounted to the chassis part 10. Here, the interlocking groove 10c, the first interlocking protrusion 14c that is arranged to be interlocked with the interlocking groove 10c, and the second interlocking protrusion 14d are completely covered by the retaining portion 15b (to be described) of the second cover member 15. Accordingly, the interlocking groove 10c, the first interlocking protrusion 14c, and the second interlocking protrusion 14d are formed so as not to be exposed to the outside.

Figure 6:
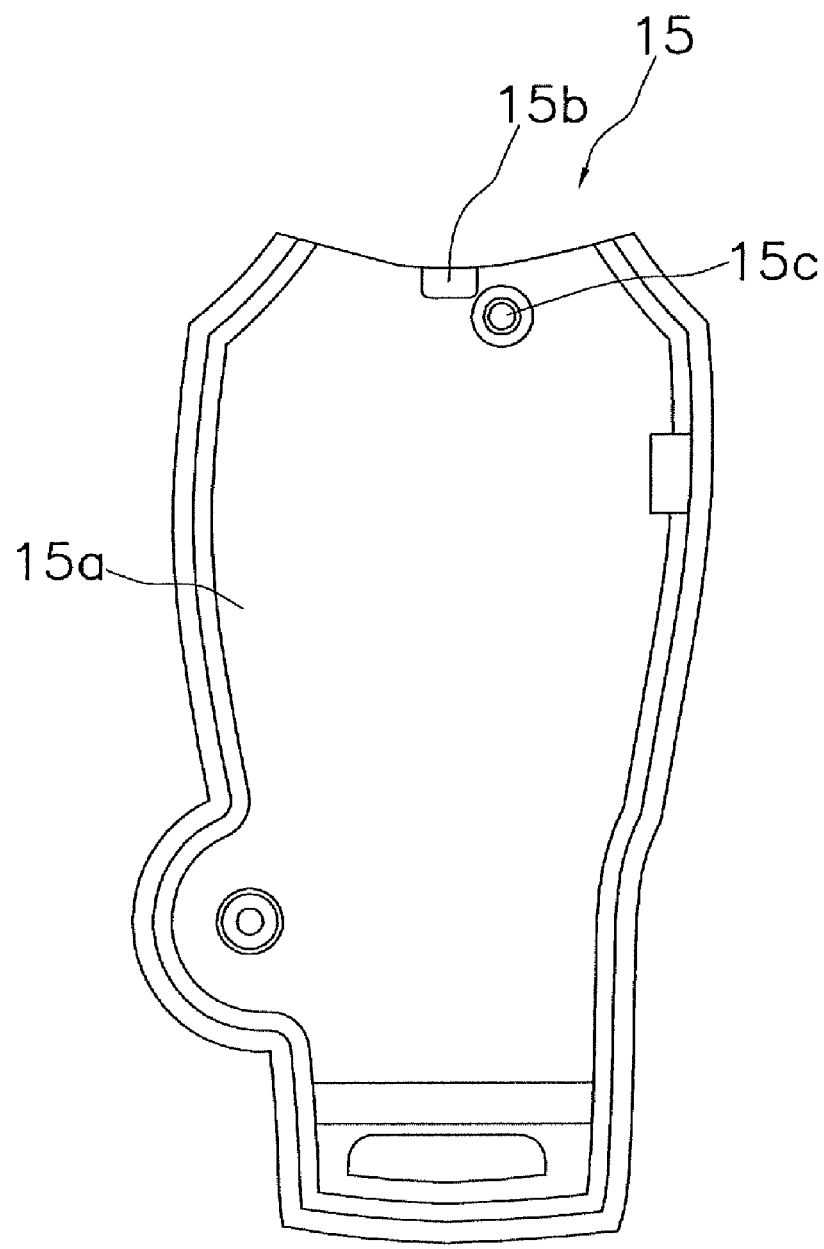
FIG. 6 is a front view of a second cover member.

As illustrated in FIGS. 2, 4, 6-8, the second cover member 15 includes a second cover body 15a, a retaining portion 15b, a positioning protruding portion 15c, and a through hole 15d. The second cover body 15a is mounted to cover the lower side of the rear part the chassis part 10 from the lower side of the rear part of the first cover member 14a. The retaining portion 15b is disposed on the upper part of the second cover body 15a and covers the surrounding portion of the first interlocking protrusion 14c that is configured to be interlocked with the interlocking groove 10c. The positioning protruding portion 15c is formed below the retaining portion 15b, which is formed on the upper part of the second cover body 15a. The positioning protruding portion 15c protrudes toward the front of the chassis part 10. The through hole 15d is formed on the bottom part of the second cover member 15 and communicates with the threaded hole 10d. As illustrated in FIGS. 6 and 7, the second cover member 15 is a concave shaped member that is bent from its rear part to the lower part. The second cover member 15 is formed to fit the outer shape of the lower side of the rear part and the lower part of the chassis part 10. The retaining portion 15b is a concave shaped cover portion formed on the upper part of the second cover body 15a. The retaining portion 15b covers the interlocking groove 10c, the first interlocking protrusion 14c configured to be interlocked with the interlocking groove 10c, and the second interlocking protrusion 14d. The protruding portion 15c is a protruding portion that protrudes forward. The protruding portion 15c is inserted into a through hole (not illustrated in the figure) formed in the rear part of the chassis part 10 so as to position the second cover member 15 in a predetermined position in the chassis part 10. Also, the second cover member 15 is fixed to the chassis part 10 by a screw member 90 fixedly inserted into the through hole 15d and the threaded hole 10d from its lower side. Here, the rearward movement of the first cover member 14 is regulated by the second cover member 15. Therefore, it is not necessary to fix the first cover member 14 to the chassis part 10 with a screw by fixing the second cover member 15 to the chassis part 10 by a screw. Also, as illustrated in FIG. 8, the second cover member 15 covers the first cover member 14 only with its retaining portion 15b. The interlocking groove 10c, the first interlocking protrusion 14c that is interlocked with the interlocking groove 10c, and the second interlocking protrusion 14d are covered with the retaining portion 15b.

As illustrated in FIGS. 2-4, the rotor driving mechanism 5 includes the master gear shaft 8, the master gear 7, and the pinion gear 9. A handle shaft 1a of the handle 1 is fixedly screwed into the master gear shaft 8. The master gear 7 is formed integral with the master gear shaft 8. The pinion gear 9 meshes with the master gear 7.

As illustrated in FIG. 3, the master gear 7 is a face gear made of aluminum alloy, for instance. The master gear 7 is integrally formed with the master gear shaft 8. As illustrated in FIG. 4, the master gear 7 is disposed so that a gear part 7a faces inward towards the chassis part 10. The gear part 7a includes tilted teeth arranged to mesh with the pinion gear 9.

As illustrated in FIG. 3, the master gear shaft 8 is a solid-core member made of aluminum alloy. However, other materials having similar characteristics may be used as well. The master gear shaft 8 is formed integral with the master gear 7. The master gear shaft 8 is rotatably mounted to the reel unit 2 by bearings 19a and 19b. Here, the bearings 19a and 19b are respectively mounted to the first boss portion 11a and the second boss portion 12a. The first boss portion 11a and the second boss portion 12a are respectively formed in the first lid member 11 and the second lid member 12.

Also, as illustrated in FIGS. 2 and 3, the master gear shaft 8 is disposed on a fishing-rod mounting side (upper side) of the spool shaft 16. Female threaded portions 8a and 8b are formed in the inner peripheral parts of both ends of the master gear shaft 8. The female threaded portions 8a and 8b are configured to be tightly screwed when the handle 1 is rotated in the line-winding direction. Therefore, the female threaded portion 8a in the left side of FIG. 3 is a left-hand threaded screw, and the female threaded portion 8b in the right side of FIG. 3 is a right-hand threaded screw. Note that the handle 1 is allowed to be mounted to one end of the master gear shaft 8 on the left position (illustrated in FIGS. 1 and 3) and the other end of the master gear shaft 8 on the right position (not illustrated in the figures). However, the screwed directions of the female threaded portions 8a and 8b are different from each other. Therefore, when the handle shaft 1a is attached on either the right position or the left position of the master gear shaft 8, a threaded portion to be exclusively used for the right position and that for the left portion are prepared.

As illustrated in FIGS. 2 and 4, the pinion gear 9 is a hollow tubular shaped member. The front part of the pinion gear 9 penetrates the rotor 3 and non-rotatably mounts the rotor 3 to the reel unit 2. As illustrated in FIG. 2, the spool shaft 16 penetrates the pinion gear 9 and is disposed in the inner peripheral part of the pinion gear 9. As illustrated in FIG. 2, a nut 17 is mounted to the front part of the pinion gear 9, and the rotor 3 is fixed to the pinion gear 9 by the nut 17. As illustrated in FIG. 2, the axially intermediate part and the axially rear end part of the pinion gear 9 are rotatably supported in the chassis part 10 of the reel unit 2 by the bearings 18a and 18b, respectively. The bearings 18a and 18b are mounted to the mechanism supporting portion 10b.

As illustrated in FIGS. 2-4, the oscillation mechanism 6 is a traverse cam typed level-winding mechanism. The oscillation mechanism 6 includes a velocity reduction mechanism 20, a warm shaft 21, a slider 22, and two guide shafts 23a and 23b. The velocity reduction mechanism 20 meshes with the pinion gear 9. The warm shaft 21 is rotated in conjunction with the velocity reduction mechanism 20. The slider 22 is engaged with the warm shaft 21 and reciprocates back and forth. The two guide shafts 23a and 23b guide the slider 22 in a direction of the spool shaft 16.

As illustrated in FIG. 4, the velocity reduction mechanism 20 includes a stepped gear 25 and an intermediate gear 26. The stepped gear 25 has a small-diameter gear 25b and a large-diameter gear 25a that meshes with the pinion gear 9. The intermediate gear 26 meshes with the small-diameter gear 25b. The intermediate gear 26 is mounted to the shaft portion of the front end part of the warm shaft 21 so as not to be allowed to rotate relative therewith. The stepped gear 25 rotates around an axis parallel to the pinion gear 9. The large-diameter gear 25a is a screw gear that meshes with the pinion gear 9. The small-diameter gear 25b is a screw gear that meshes with the intermediate gear 26. As illustrated in FIG. 2, the pinion gear 9 is disposed below the master gear shaft 8, and the stepped gear 25 and the intermediate gear 26 are disposed above the master gear shaft 8. The intermediate gear 26 is a screw gear fixedly mounted to the front end part of the warm shaft 21 so as not to be allowed to rotate relative therewith. Because the small-diameter gear 25b meshes with the intermediate gear 26 and the intermediate gear 26 has a diameter greater than that of the small-diameter gear 25b, revolution of the pinion gear 9 transmitted to the warm shaft 21 are greatly reduced. With the velocity reduction mechanism 20, the velocity of the spool 4 is reduced. Accordingly, it is possible to densely wind the fishing line.

As illustrated in FIGS. 2 and 4, an intersecting spiral-shaped spiral groove 21a is formed on the surface of the warm shaft 21. The warm shaft 21 is disposed in parallel to the spool shaft 16. The warm shaft 21 is rotatably mounted to the front and rear ends of the chassis part 10. The warm shaft 21 is mounted to the chassis part 10 from behind the chassis part 10.

As illustrated in FIGS. 2-4, the slider 22 includes an engaging member 22a and a slider body 22b. The engaging member 22a is engaged with the spiral groove 21a of the warm shaft 21. The engaging member 22a is mounted to the slider body 22b. The engaging member 22a moves back and forth in conjunction with rotation of the warm shaft 21. With a configuration that the engaging member 22a is engaged with the spiral groove 21a, the slider 22 reciprocates in the spool shaft direction in accordance with rotation of the warm shaft 21, and accordingly reciprocates the spool shaft 16 in conjunction with rotation of the handle 1.

As illustrated in FIGS. 2 and 4, the rotor 3 includes a rotor body 35 and a bail arm 34. The rotor body 35 is rotatably mounted to the reel unit 2 through the pinion gear 9. The bail arm 34 is pivotably mounted to the rotor body 35. For instance, the rotor body 35 is made of aluminum alloy. However, other materials having similar characteristics may be used as well. The rotor body 35 includes a tubular support portion 30 and first and second rotor arms 31 and 32. The tubular support portion 30 is fixed to the pinion gear 9. The first and second rotor arms 31 and 32 extend forward from opposed positions on the outer peripheral surface of the rear end part of the support portion 30 so as to be separated from the support portion 30 at a predetermined interval. The support portion 30, the first rotor arm 31, and the second rotor arm 32 make up the rotor body 35. The support portion 30, the first rotor arm 31, and the second rotor arm 32 are made up of, for instance, aluminum alloy. However, other materials having similar characteristics may be used as well. The support portion 30 and the first and second rotor arms 31 and 32 are formed integral by a die-cast molding method. However, other methods to achieve similar results may be used as well. As illustrated in FIGS. 1 and 2, the radially outer peripheral side of the first rotor arm 31 and that of the second rotor arm 32 are covered with a first cover member 36 and a second cover member 37, respectively. Also, a first bail support member 40 and a second bail support member 42 make up the bail arm 34. The first and second bail support members 41 and 42 are pivotably mounted to the outer peripheral side of the tip of the first rotor arm 31 and that of the second rotor arm 32. The bail arm 34 is provided to guide and wind the fishing line around spool 4. The bail arm 34 is allowed to swing back and forth between a line-guiding posture and a line-releasing posture, which flips from the line-guiding posture.

As illustrated in FIG. 2, the rotor 3 is allowed to block and release rotation in the line-releasing direction by the anti-reverse rotation mechanism 50. The anti-reverse rotation mechanism 50 includes the roller typed one-way clutch 51 mounted to the mechanism supporting portion 10b of the chassis part 10. The one-way clutch 51 is allowed to switch between a reverse-rotation prohibited state and a reverse-rotation permitted state. The anti-reverse rotation mechanism 50 further includes a switching operating part 52 for switching the one-way clutch 51 between the reverse-rotation prohibited state and the reverse-rotation permitted state. The switching operating part 52 is pivotably supported in the bottom part of the mechanism supporting portion 10b of the chassis part 10.

As illustrated in FIG. 2, the spool 4 is formed to have a shallow groove shape and includes a bobbin trunk 4a, a tubular skirt portion 4b, and a front flange portion 4c. The fishing line is wound around the outer periphery of the bobbin trunk 4a. The tubular skirt portion 4b is formed on the rear end part of the bobbin trunk 4a and has a diameter greater than that of the bobbin trunk 4a. The front flange portion 4c is formed on the front end part of the bobbin trunk 4a and has a diameter slightly greater than that of the bobbin trunk 4a.

This spinning reel has the following configuration: the interlocking groove 10c is exposed to the outside and is formed on the rear upper surface of the chassis part 10; the mounting hole 13 is opened rearward and is formed in the attachment portion 13; and the first cover member 14 generally includes the pivot shaft portion 14b that is pivotably mounted to the mounting groove 13b, and the first interlocking protrusion 14c that is allowed to be interlocked with the interlocking groove 10c when the pivot shaft portion 14b is mounted to the mounting hole 13b and the first cover body 14a is pivoted around the axis of the mounting hole 13b.

Here, the first cover member 14 is configured so that the first interlocking protrusion 14c is interlocked with the interlocking groove 10c when the first cover body 14a is pivoted with respect to the axis of the mounting hole 13b. Therefore, even if a great force is applied to the first cover member 14, the first cover member 14 will not easily come off the chassis part 10. In addition, even if the first cover member 14 experiences a strong pulling force in the rearward direction, the rear end surface of the first interlocking protrusion 14c is interlocked with the interlocking groove 10c so that the first cover member 14 will not easily come off the chassis part 10. This is because the pivot direction of the first cover member 14 is in a horizontal direction perpendicular to a attachment/detachment direction of the first cover member 14 while the attachment/detachment direction of the first cover member 14 is from the rear to the front. Thus, the first cover member 14 will not easily come off the reel body in the rearward direction.

Furthermore, the second cover member 15 is herein configured to cover the surrounding area of the first interlocking protrusion 14c that is interlocked with the interlocking groove 10c in the lower side of the rear part of the first cover member 14 by the retaining portion 15b disposed on the upper part. Therefore, it is possible to regulate the rearward movement of the first cover member 14 by the second cover member 15, and thereby the first cover member 14 will not easily come off the chassis part 10 in the rearward direction.

Other Example Embodiments (a) In the above described example embodiment, a spinning reel for surf casting has been exemplified. However, a spinning reel of another aspect may be produced, which includes the first cover member 14 and the second cover member 15 of the above described example embodiment.

Figure 9:
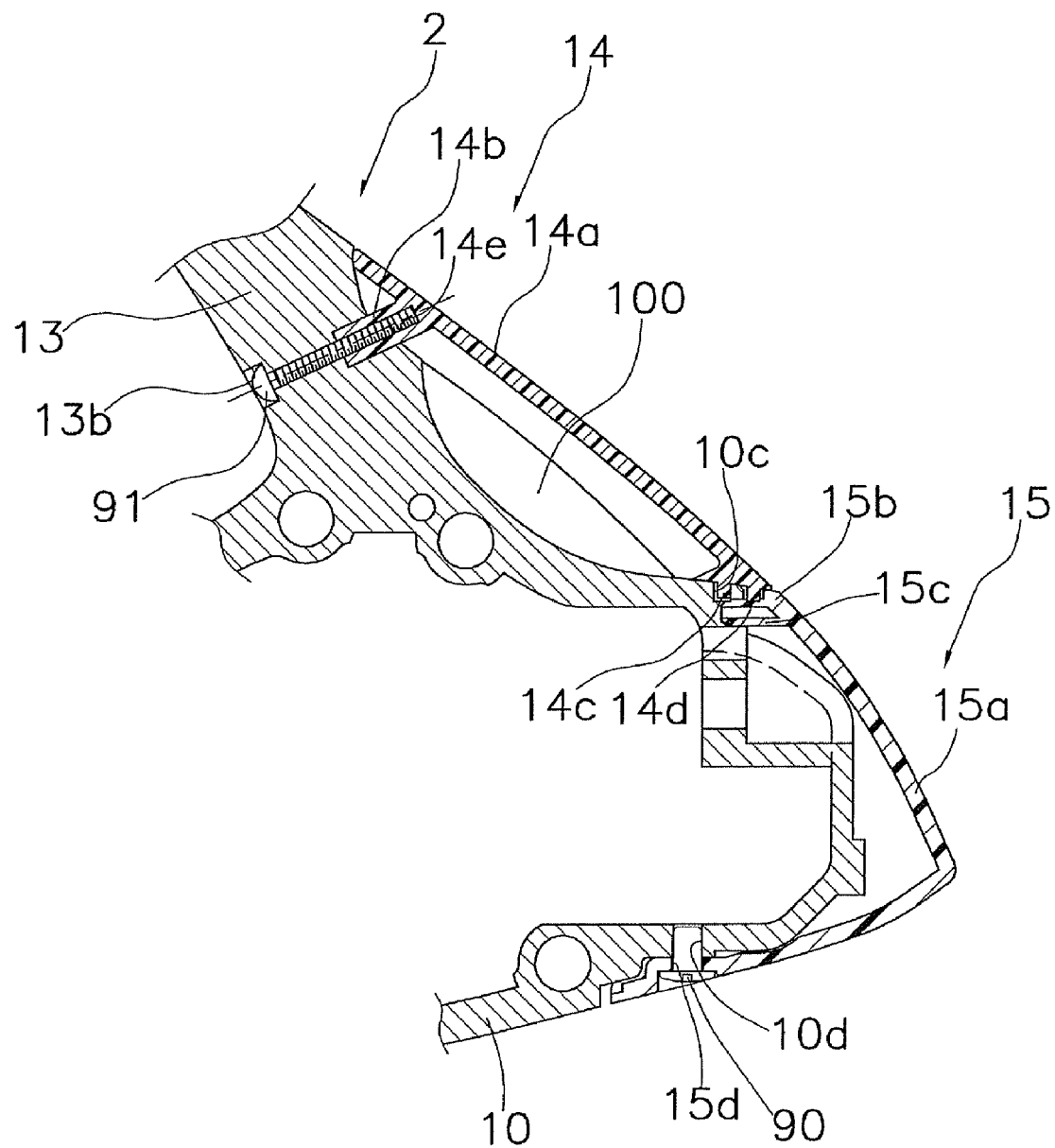
FIG. 9 is a diagram in accordance with another embodiment, which corresponds to FIG. 7.
Figure 10:
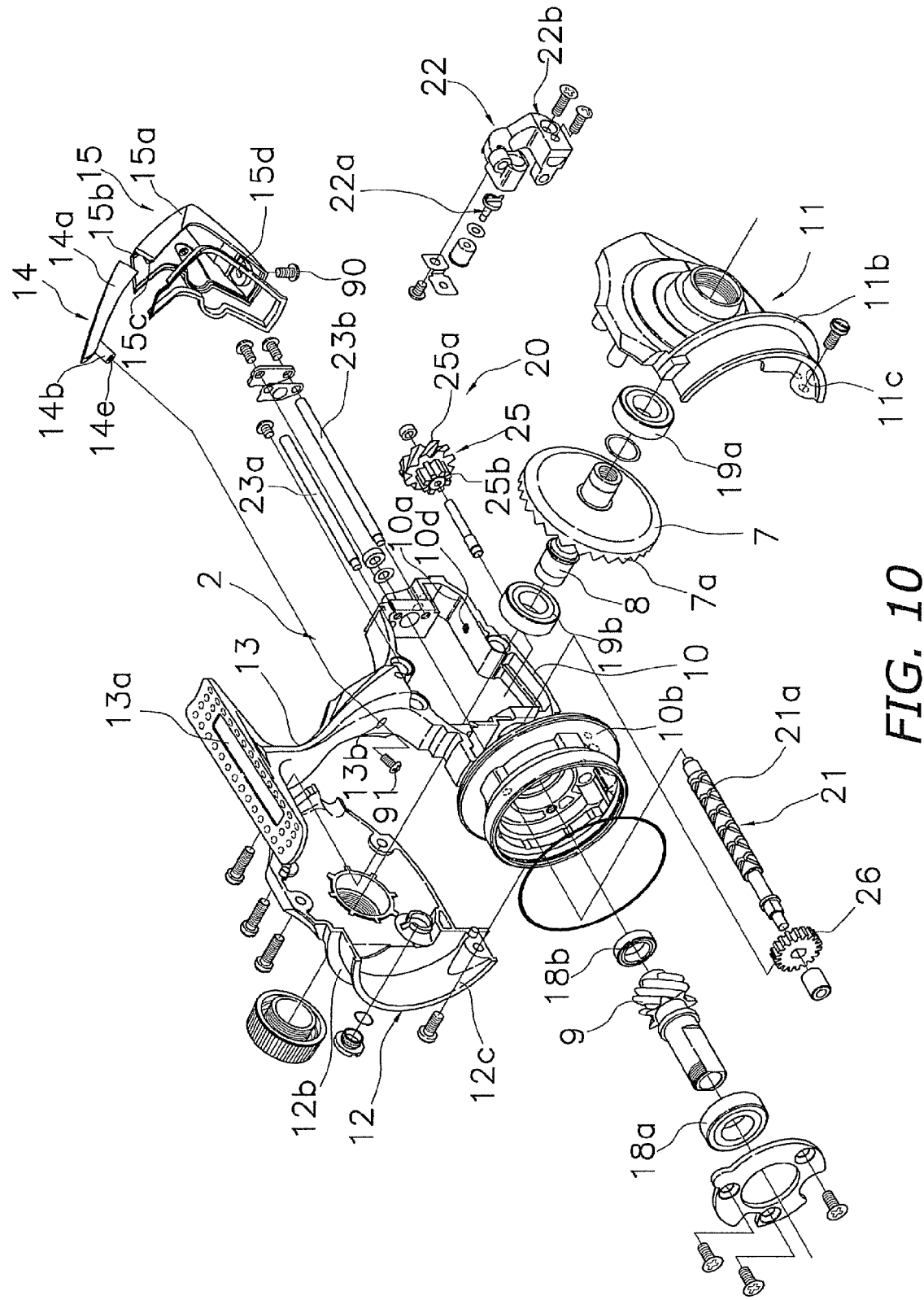
FIG. 10 is a diagram in accordance with another embodiment, which corresponds to FIG. 4.

(b) In the above described example embodiment, the mounting hole 13b penetrates the attachment portion 13 and the attachment portion 13 is opened frontward and rearward. However, the mounting hole 13b may be a recessed portion only opened rearward. Also, as illustrated in FIGS. 9 and 10, the first cover member 14 may be configured to be secured to the attachment portion 13 with a configuration that a threaded hole 14e is formed in the front end part of the pivot shaft portion 14b and a screw member 91 to be mounted from the front side is screwed into the threaded hole 14e.

(c) In the above described example embodiment, the second interlocking protrusion 14d is supported between the rear end part of the chassis part 10 and the retaining portion 15b of the second cover member 15. However, only the first interlocking protrusion 14c may be provided without providing the second interlocking protrusion 14d. Also, another interlocking groove (not illustrated in the figure) may be formed on the rear side of the interlocking groove 10c on the rear end part of the chassis part 10, and a second interlocking protrusion 14d may be interlocked with the interlocking groove.

(d) In the above described example embodiment, the first cover member 14 and the second cover member 15 are made of relatively hard synthetic resin such as ABS resin. However, material to be used is not limited to this. For example, a light weight material may be used to construct the first cover member 14, which is not inclined to experience a high impact force, may be formed with synthetic resin. On the other hand, a high strength material, e.g. a hard metal, may be used to construct the second cover member 15, which may be more prone to make contact with a hard surface.

A used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention should be interpreted relative to a device equipped with the present invention.

The term "configured" as used herein to describe a component, section or part of a device refers to a component, section or part of a device that is constructed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit of a spinning reel, an upper part of the reel unit being mounted to a fishing rod and arranged to reel out a fishing line forward, comprising:
    a reel body having a variety of mechanisms mounted in an interior thereof, the reel body having an interlocking groove on an upper rear surface, the interlocking groove being exposed to the outside;
    an attachment portion arranged to be mounted to the fishing rod, the attachment portion having a mounting hole opened rearward, the attachment portion being formed integral with and extending forward from the reel body in an oblique upward direction;
    a first cover member having a first cover body, a pivot shaft portion, and an interlocking protrusion, the first cover body being mounted to the reel body so as to cover the upper side of the rear part of the reel body from the lower side of the rear part of the attachment portion, the pivot shaft portion being formed on the upper side of a front part of the first cover body so as to protrude frontward, the pivot shaft portion being pivotally mounted to the mounting hole, the interlocking protrusion being formed on a bottom part of the first cover body, the interlocking protrusion being arranged to interlock with the interlocking groove when the pivot shaft portion is mounted to the mounting hole and the first cover body is pivoted with respect to the axis of the mounting hole; and
    a second cover member including a second cover body that being mounted to the reel body so as to cover the lower side of the rear part of the reel body from the lower side of the rear part of the first cover member.

2. The reel unit of a spinning reel of claim 1, further comprising
    a retaining portion that being formed in an upper part of the second cover body, and that being arranged to overlap with at least a part of the first cover member.

3. The reel unit of a spinning reel of claim 2, wherein the retaining portion is arranged to overlap with the surrounding of the interlocking groove and the interlocking protrusion interlocked with the interlocking groove.

4. The reel unit of a spinning reel of claim 3, wherein the first cover member further includes a protrusion formed on a bottom part of the first cover body so as to protrude downward, the protrusion being supported between the rear end part of the reel body and the retaining portion of the second cover member when the second cover member is mounted to the reel body.

5. The reel unit of a spinning reel of claim 1, wherein the mounting hole and the pivot shaft portion mounted to the mounting hole extend forward in an oblique downward direction.

6. The reel unit of a spinning reel of claim 1, wherein the reel body is constructed such that a hollow space is formed between the reel body and the first cover member when the first cover member is mounted to the reel body.

7. The reel unit of a spinning reel of claim 1, wherein the reel body further includes a threaded hole formed on the bottom part thereof,
    wherein the second cover member further includes a through hole formed in a bottom part thereof, the through hole arranged to communicate with the threaded hole, and
    wherein the second cover member is fixedly coupled to the reel body by a screw member mounted via the through hole and the threaded hole.

* * * * *